Nov. 2, 1954 R. J. WALTER ET AL 2,693,354
VEHICLE WHEEL SUSPENSION MEANS
Filed Nov. 18, 1952 3 Sheets-Sheet 2
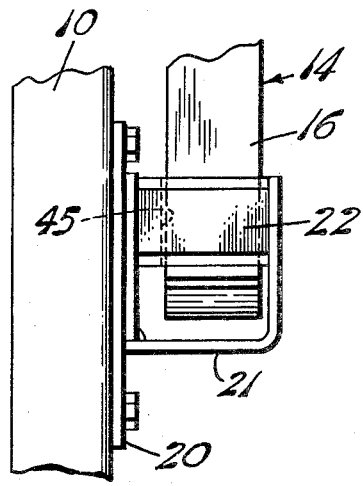
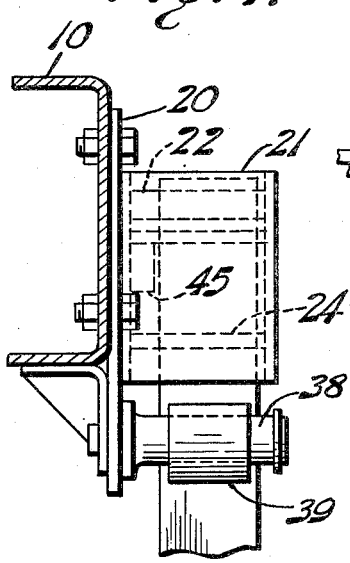
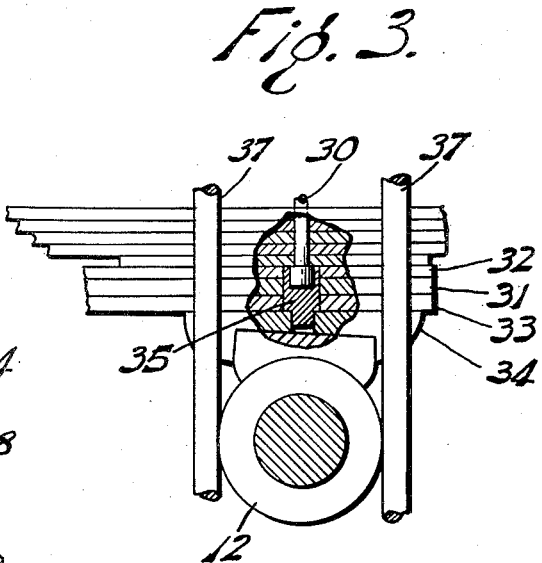
INVENTORS
ROBERT J. WALTER
and EDWIN J. BOECK
BY
Beau, Brooks, Buckley & Beau.
ATTORNEYS.

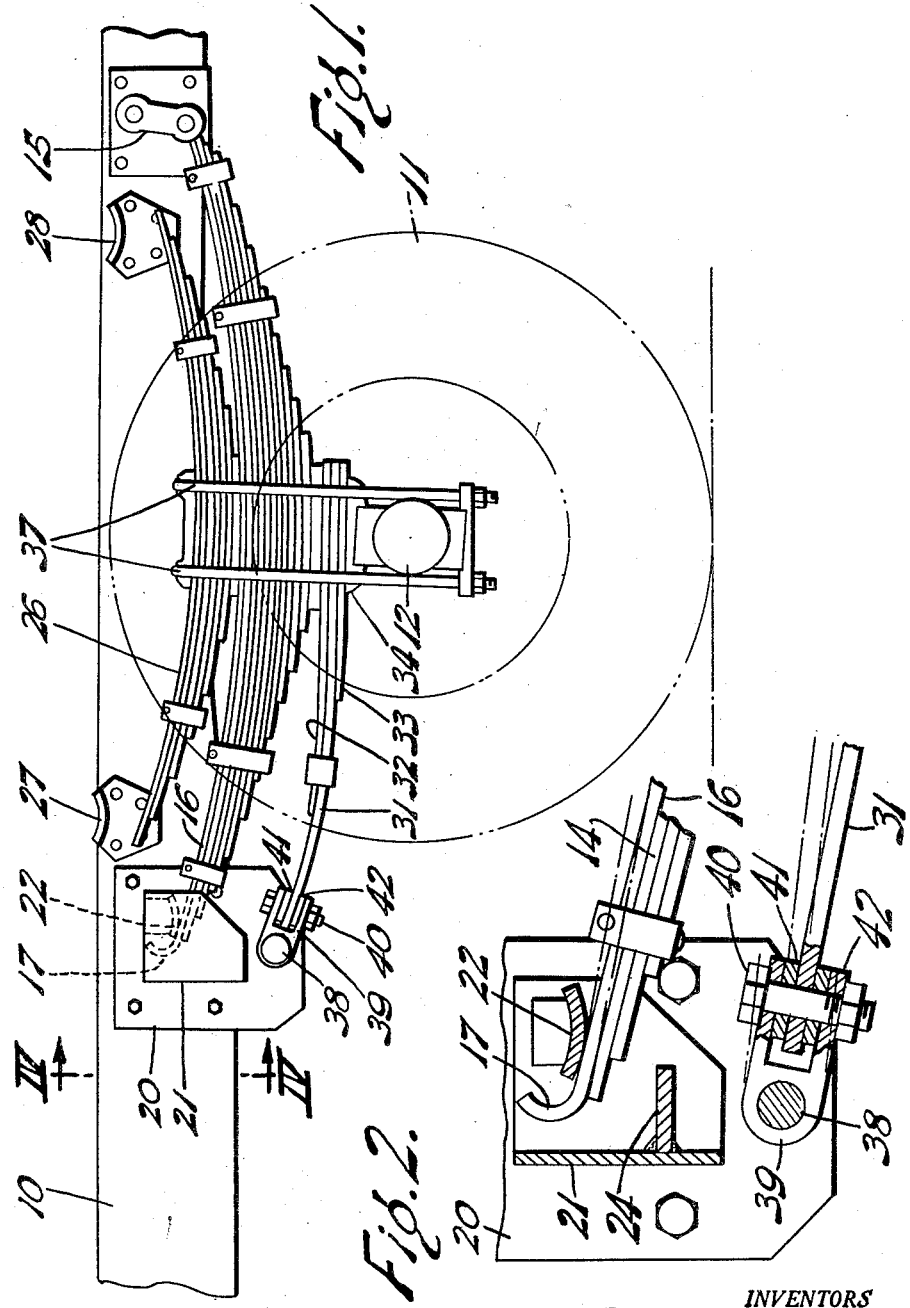

Nov. 2, 1954 R. J. WALTER ET AL 2,693,354
VEHICLE WHEEL SUSPENSION MEANS
Filed Nov. 18, 1952 3 Sheets-Sheet 3
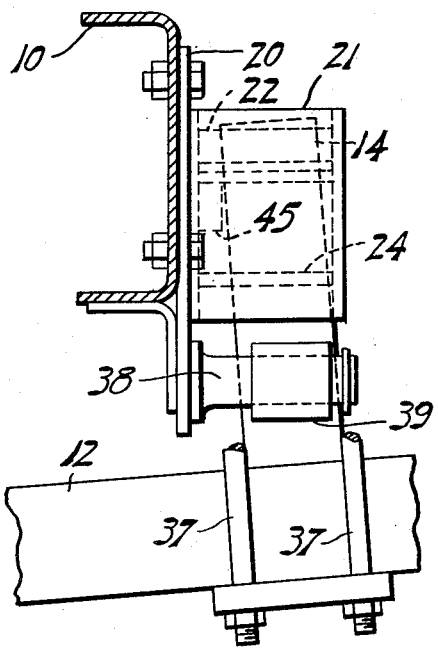
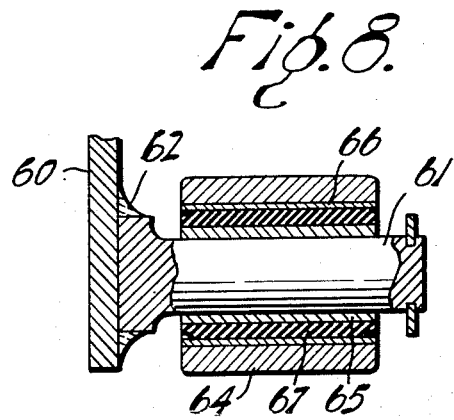
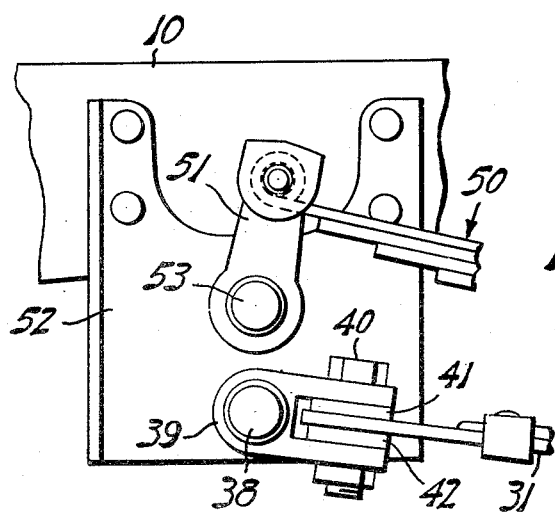
INVENTORS
ROBERT J. WALTER
and EDWIN J. BOECK
BY
Beau, Brooks, Buckley & Beau.
ATTORNEYS.

United States Patent Office 2,693,354
Patented Nov. 2, 1954

2,693,354

VEHICLE WHEEL SUSPENSION MEANS

Robert J. Walter, Kenmore, and Edwin J. Boeck, Buffalo, N. Y., assignors to Truck Equipment Co., Inc., Buffalo, N. Y.

Application November 18, 1952, Serial No. 321,192

17 Claims. (Cl. 267—56)

This invention relates to vehicular wheel suspensions and particularly to novel means for resisting the driving and/or braking torque of the driving or braking wheels of vehicles.

In the motor vehicle art there are various well recognized types of wheel suspensions with respect to the provision which is made for receiving and transmitting the driving and braking thrust or torque of driving and braking wheels. The most common classes are the Hotchkiss drive, the torque tube drive, and various radius rod, distance rod or radius arm constructions. The present invention relates particularly to the radius arm type of construction wherein a member which extends generally lengthwise of the vehicle acts between the rear axle housing and a portion of the vehicle frame to resist the rotative tendency which is imposed upon the axle housing due to forces arising out of the driving torque or braking torque, or both, of the wheels associated with the axle housing.

In the case of Hotchkiss drive vehicles wherein the suspension leaf springs are intended to be designed with sufficient strength and stiffness to receive and transmit the driving and braking torque, it has been found that the durability and capacity for resisting wear and ultimate failure of the spring suspension of a vehicle may be greatly increased by providing auxiliary means for receiving and transmitting the driving and braking torque, thus leaving the usual suspension springs with only the weight-bearing and shock-absorbing function.

While this invention arises primarily out of the circumstances surrounding the conversion of a motor vehicle from a Hotchkiss drive type to a radius arm type, the ultimate construction which is achieved herein has advantages which may be availed of in cases where a vehicle is not the subject of conversion but is being initially constructed as a type of vehicle wherein the driving and braking thrust is received and transmitted by radius arms or distance arms, rather than by the suspension leaf springs as in the case of Hotchkiss drive vehicles.

According to the present invention a leaf spring radius arm construction is provided which, while it is extremely sturdy and transmits the braking and driving torque in a highly rigid and effective manner, nevertheless accommodates itself with a high degree of flexibility to the various changes in geometry which arise out of the highly variable loadings and distortions to which the wheel suspension means is subject in normal and abnormal use. Furthermore, the radius arm construction of the present invention, while not limited to such use, adapts itself with remarkable facility in instances where it is desired to add radius arm construction to existing wheel suspensions of the Hotchkiss type or of other types.

Several specific embodiments of the principles of the present invention are illustrated in the drawings and described in detail in the following specification. However, it is to be understood that these exemplary constructions are set forth to illustrate the principles of the present invention and the scope of the invention is not limited to these particular forms, nor otherwise than as defined in the appended claims.

In the drawings:

Fig. 1 is a fragmentary side elevational view of the rear portion of a motor truck frame having its rear driving wheels provided with a suspension constructed in accordance with one form of the present invention;

Fig. 2 is a view taken similarly to Fig. 1 but showing only a front end portion of the suspension means illustrated in Fig. 1 and with portions broken away for added illustration;

Fig. 3 is a view likewise taken similarly to Fig. 1 but showing only the central portion of the suspension means and with portions thereof likewise broken away for added illustration;

Fig. 4 is a fragmentary cross sectional view taken approximately on the line IV—IV of Fig. 1;

Fig. 5 is a fragmentary top plan view of the front end portion of the suspension means illustrated in Fig. 4.

Fig. 6 is a view similar to Fig. 4 but showing the parts subjected to deflection or distortion;

Fig. 7 is a view similar to Fig. 2 but showing another embodiment of the invention; and Fig. 8 is a detailed cross sectional view of a modified form of the front transverse pivot pin for the radius arm.

Like characters of reference denote like parts throughout the several figures of the drawings and, referring particularly to Figs. 1 through 6, the numeral 10 designates one of a pair of opposed frame members of a truck chassis. While the drawings illustrate the left rear wheel suspension of the vehicle, it is of course understood that this construction is duplicated for the right rear wheel suspension. A rear driving wheel is indicated in dot-and-dash lines at 11 and the numeral 12 designates a portion of the usual rear axle housing, the portion indicated in the drawing being that portion which lies just inside of the wheel 11.

In the form of the invention illustrated in Figs. 1 through 6 the main wheel-suspension member comprises a generally conventional multi-leaf, semielliptic spring assembly 14 having its rear end connected to the frame member 10 of the vehicle chassis by a conventional shackle 15. The main leaf of the spring assembly 14 is designated 16 and its forward end is curved arcuately as indicated at 17 in Figs. 1 and 2, for purposes which will presently appear.

It is to be understood that the embodiment of the present invention now being described shows a rear wheel suspension wherein a Hotchkiss drive suspension has been converted to one wherein the braking and driving torque are transmitted from the rear axle housing to the vehicle frame members by radius or distance arm means in the form of an auxiliary leaf spring assembly. Thus, in the present instance the arcuate forward end 17 of main leaf spring 16 is provided by merely cutting off a portion of the usual front eye of the main leaf of a Hotchkiss drive rear wheel spring assembly.

A mounting plate 20 is rigidly bolted to the side frame member 10 and has rigidly attached to its outer face, as by welding, a vertically extending U-shaped bracket member 21. A downwardly convex pad 22 extends transversely between the flanges of bracket member 21, being preferably welded at its opposite ends to such flanges, and under normal conditions the top forward surface of the main or top leaf 16 of the spring assembly 14 is in abutment with pad 22 as clearly illustrated in Fig. 2.

It will be seen from the foregoing that the weight of the rear portion of the vehicle chassis and the load thereon will normally maintain abutment between the spring leaf 16 and pad 22. The radius arm construction of the present invention will normally prevent any material relative longitudinal movement between spring leaf 16 and pad 22. However, if the radius arm should break or otherwise fail to operate, forward movement of the spring assembly relative to the vehicle chassis is limited by abutment of the curved portion 17 of spring leaf 16 against the web portion of bracket member 21, and rearward relative movement of the spring assembly is limited by engagement of the inner portion of the curved portion 17 of the spring leaf 16 against the adjacent edge of pad 22. Undue vertical downward movement of the spring assembly relative to the vehicle chassis is limited by a flange 24 which is fixed between the flanges of bracket member 21 by welding or the like as clearly illustrated in Fig. 2.

In the construction illustrated herein by way of example a multi-leaf helper spring assembly overlies the main spring assembly 14 and is designated 26 in Fig. 1.

The helper spring assembly 26 is retained by the same center bolt and U-bolt devices as the main spring assembly 14 and its opposite ends are normally free and disengaged but are adopted to engage pads 27 and 28, which project rigidly from frame member 10, whenever the deflection of the spring means is sufficient to bring the opposite ends of helper spring assembly 26 into engagement with pads 27 and 28.

Reference will now be had to the radius arm or distance arm portion of the apparatus of the present invention which, in the instance illustrated in Figs. 1 through 6, is introduced in converting a Hotchkiss drive vehicle wheel suspension construction to a construction wherein the driving and braking torque are transmitted to the vehicle frame by radius arms in the form of leaf spring assemblies. Referring to Fig. 3, the numeral 30 designates the usual center bolt which passes upwardly through the leaves of both the main spring assembly 14 and the helper spring assembly 26 in the usual manner.

In the form of the invention illustrated herein the center bolt 30 is retained and accordingly the leaves of the main spring assembly and the helper spring need not be disassembled in the process of introducing and assembling the present suspension means. The radius arm portion of the present apparatus comprises a main spring leaf 31 and upper and lower auxiliary leaves 32 and 33, respectively. The three spring leaves are interposed between the bottom of the main spring assembly 14 and the usual spring seat member 34 which is positioned upon the rear axle housing. For present purposes the spring seat member may be regarded as a part of the rear axle housing.

The radius arm leaves 31, 32, and 33 are provided with central openings of generally larger size than the center openings in the leaves of the main and helper springs to receive an adapter or dowel member 35 which is of generally cylindrical form but is provided at its upper end with a recess for receiving the head of the center bolt 30 and is provided at its lower end with a projection which simulates the head of center bolt 30 and seats within the usual recess in spring seat member 34, thus replacing the head of spring center bolt 30 in this regard. The usual U-bolts which retain the main and helper spring assemblies in rigid attachment with the rear axle housing are replaced by longer U-bolts 37 which serve the same function but also include the leaves 31 through 33 of the radius arm portion of the wheel suspension means.

Mounting plate 20 carries a rigid laterally projecting bearing pin or trunnion 38 and a clevis 39 has a bearing portion which is rotatably and axially-slidably mounted on pin 38. The rear bifurcated portion of clevis 39 lies above and below the forward or outer end of the main radius arm spring leaf 31 and is pivotally connected thereto about a generally upright axis by means of a pivot bolt 40. In the present instance suitable upper and lower spacing washers 41 and 42 are disposed between radius arm spring leaf 31 and the upper and lower bifurcated portions of clevis 39.

It will be seen from the foregoing that the forward or outer end of radius arm spring leaf 31 is free to pivot about a generally vertical axis relative to the clevis 39 and the latter is free to slide axially on pin 38 to compensate for variations in the effective horizontal spacing or location of the clevises 39 at opposite sides of the vehicle due to unequal deflections of the spring suspensions at opposite sides.

Referring to Figs. 4 and 5, a spacing block 45 is welded to the inner flange of bracket member 21 and cooperates with the outer flange of the bracket member to confine the front end portion of spring leaf 16 laterally. Fig. 6 shows in a general way the condition which exists when the main spring assembly at one side of the vehicle is subjected to a much greater degree of deflection than the opposite spring assembly. The manner in which this condition causes the clevis 39 to move axially outwardly along pivot pin 38 is believed to be obvious from the illustration.

It will be seen from the foregoing that the center bolt 30 may be of small diameter since it merely locates the spring leaves and is free of the longitudinal forces of the driving and braking torque. Thus the weight and shock bearing spring leaves may have a minimum diameter center hole for maximum strength. On the other hand, the adapter or dowel 35 is of much larger diameter and is much more efficient as a transimssion member for the driving and braking torque forces. The larger openings in the radius arm leaves for receiving dowel 35 are not a factor of weakness since these spring leaves are subjected mainly to longitudinal tension and compression forces.

Fig. 7 shows a wheel suspension arrangement which is the same as that of Figs. 1 through 6 insofar as the radius arm structure and arrangement is concerned but in Fig. 7 the front end of the main supporting leaf spring assembly, designated generally 50, has a main leaf terminating in the usual eye for pivotal engagement with a shackle 51, the latter having pivotal mounting on a mounting plate 52 as at 53 in Fig. 7, the latter corresponding to the mounting plate 20 of the previous embodiment. The radius arm and its connection with mounting plate 52 are substantially the same as in the previous embodiment and accordingly the same reference numerals are applied to these parts without repeating the description thereof.

In the modification shown in Fig. 8 the horiontal pivotal connection of the forward end of the radius arm is provided with a rubber bushing or sleeve to permit angular deflection or misalinement of the axis of the pivot bearing with respect to its journal or trunnion pin. This form of connection may be employed with either of the previously described embodiments, that is, whether the front end of the main spring assembly is provided with the hook and abutment arrangement of Figs. 1, 2, 4 and 5 or the shackle mounting of Fig. 7.

Referring to Fig. 8, a mounting plate 60 carries a laterally extending pivot pin or trunnion 61, these parts corresponding to mounting plate 20 and pivot pin 38 of Figs. 1 through 4. In Fig. 8 the pivot pin 61 is welded at its inner end to mounting plate 60 as at 62. In Fig. 8 the numeral 64 designates the front bearing or eye of a spring leaf radius arm which corresponds to the spring leaf 31 of Figs. 1 and 2, the vertical pivot 40 being omitted in the present modification. A composite bushing interposed between pivot pin 61 and bearing 64 comprises inner and outer metal bushings or sleeves 65 and 66 and an intermediate rubber bushing 67. The inner sleeve 65 may comprise a bronze bushing and is free to rotate and slide axially on pivot pin 61.

What is claimed is:

1. A torque medium for vehicle wheel suspensions including a vehicle frame, a supporting wheel and axle, and resilient means acting between said frame and axle, said torque medium comprising a spring leaf fixed at one end to said axle and extending generally longitudinally outwardly therefrom, connection means carried by said frame including a horizontal journal, bearing means pivotal and axially slidable on said journal, and means pivoting said bearing means and the outer portion of said spring leaf on a generally upright axis.

2. A torque medium for vehicle wheel suspensions including a vehicle frame, a supporting wheel and axle, and resilient means acting between said frame and axle, said torque medium comprising a spring leaf adapted to be fixed at one end to said axle and extend generally longitudinally outwardly therefrom, connection means securable to said frame and including a horizontal journal, bearing means pivotal and axially slidable on said journal, and means pivoting said bearing means and the outer portion of said spring leaf on a generally upright axis.

3. A torque medium for vehicle wheel suspensions including a vehicle frame, a supporting wheel and axle, and resilient means acting between said frame and axle, said torque medium comprising a spring leaf fixed at one end to said axle and extending generally longitudinally outwardly therefrom, and a connection between said frame and the extending portion of said spring leaf, horizontal transverse bearing means between said connection and said frame and generally vertical bearing means between said connection and said spring leaf extending portion, said horizontal transverse bearing means providing for sliding movement of the connected parts in an axial direction.

4. A torque medium for vehicle wheel suspensions including a vehicle frame, a supporting wheel and axle, and resilient means acting between said frame and axle, said torque medium comprising a spring leaf fixed at one end to said axle and extending generally longitudinally outwardly therefrom, and a connection between said frame and the extending portion of said spring leaf, said connection having vertical pivot bearing means and horizontal transverse pivot bearing means, one of said pivot bearing means engaging with said frame and the other with said spring leaf extending portion, said horizontal transverse bearing means providing for sliding movement of the connected parts in an axial direction.

5. A vehicle wheel suspension comprising a frame, an axle housing and wheel means associated therewith, a longitudinally extending leaf spring fixed medially to said axle housing and having its opposite ends connected to said frame for limited relative longitudinal movement, radius arm means comprising connection means carried by said frame and spaced longitudinally of said axle housing and a leaf spring fixed between said first mentioned leaf spring and said axle housing and extending longitudinally to said connection means, said connection means comprising a horizontal bearing element, a cooperating bearing element rotatably supported thereby, said bearing elements having limited relative axial sliding movement, and means pivoting said second bearing element and the adjacent portion of said radius arm leaf spring on a generally upright axis.

6. A vehicle wheel suspension comprising a frame, an axle housing and wheel means associated therewith, a longitudinally extending leaf spring fixed medially to said axle housing and having its opposite ends engageable with said frame for limited relative longitudinal movement, the engagement at one end of said spring comprising an abutment on said frame bearing downwardly against said leaf spring adjacent to its end and a hooked portion on said leaf spring longitudinally outwardly of said abutment and a stop on said frame longitudinally outwardly of the hooked portion, whereby the hooked portion has limited longitudinal relative movement between said stop and said abutment, and means acting between said axle housing and said frame for resisting the driving and braking torque forces on said axle housing.

7. A vehicle wheel suspension comprising a frame, an axle housing and wheel means associated therewith, a longitudinally extending leaf spring assembly fixed medially to said axle housing and having its opposite ends engageable with said frame for limited relative longitudinal movement, a vertical center bolt through said lef spring assembly, radius arm means comprising connection means carried by said frame and spaced longitudinally of said axle housing and a leaf spring fixed between said first mentioned leaf spring and said axle housing and extending longitudinally to said connection means, and a generally cylindrical member extending vertically through said radius arm leaf spring in alinement with said center bolt, said cylindrical member being recessed at its upper end to receive the lower end of said center bolt and interfitting at its lower end with said axle housing.

8. A vehicle wheel suspension comprising a frame, an axle housing and wheel means associated therewith, a longitudinally extending leaf spring fixed medially to said axle housing and having its opposite ends engageable with said frame for limited relative longitudinal movement, the engagement at one end of said spring comprising an abutment on said frame bearing downwardly against said leaf spring adjacent to its end and an upwardly hooked portion on said leaf spring longitudinally outwardly of said abutment and a stop on said frame longitudinally outwardly of the hooked portion, whereby the hooked portion has limited longitudinal relative movement between said stop and said abutment, and means acting between said axle housing and said frame for resisting the driving and braking torque forces on said axle housing.

9. A vehicle wheel suspension comprising a frame, an axle housing and wheel means associated therewith, a longitudinally extending leaf spring assembly fixed medially to said axle housing and having its opposite ends engageable with said frame for limited relative longitudinal movement, a vertical center bolt through said leaf spring assembly and having an enlarged head at the under side of said assembly, radius arm means comprising connection means carried by said frame and spaced longitudinally of said axle housing and a leaf spring fixed between said first mentioned leaf spring and said axle housing and extending longitudinally to said connection means, and a generally cylindrical member extending vertically through said radius arm leaf spring in alinement with said center bolt, said cylindrical member being of larger diameter than said center bolt head and recessed at its upper end to receive the same, said cylindrical member interfitting at its lower end with said axle housing.

10. A vehicle wheel suspension comprising a frame, an axle housing and wheel means associated therewith, a longitudinally extending leaf spring assembly fixed medially to said axle housing and having its opposite ends engageable with said frame for limited relative longitudinal movement, a vertical center bolt through said leaf spring assembly with its head portion at the under side of said assembly, radius arm means comprising connection means carried by said frame and spaced longitudinally of said axle housing and a leaf spring fixed between said first mentioned leaf spring and said axle housing and extending longitudinally to said connection means, and a dowel member extending vertically through said radius arm leaf spring in alinement with said center bolt, said dowel member being recessed at its upper end to receive said center bolt head portion and interfitting at its lower end with said axle housing.

11. A vehicle wheel suspension comprising a frame, an axle housing and wheel means associated therewith, a longitudinally extending leaf spring assembly fixed medially to said axle housing and having its opposite ends engageable with said frame for limited relative longitudinal movement, a vertical center bolt through said leaf spring assembly with its head portion at the under side of said assembly, radius arm means comprising connection means carried by said frame and spaced longitudinally of said axle housing and a leaf spring fixed between said first mentioned leaf spring and said axle housing and extending longitudinally to said connection means, and a dowel member extending vertically through said radius arm leaf spring in alinement with said center bolt, said dowel member being recessed at its upper end to receive said center bolt head portion, the lower end of said dowel member being formed to simulate said center bolt head portion and interfit with said axle housing.

12. A vehicle wheel suspension comprising a frame, an axle housing and wheel means associated therewith, a longitudinally extending leaf spring assembly fixed medially to said axle housing and having its opposite ends engageable with said frame for limited relative longitudinal movement, vertical center bolt means including a shank portion extending through said leaf spring assembly, radius arm means comprising connection means carried by said frame and spaced longitudinally of said axle housing and a leaf spring fixed between said first mentioned leaf spring and said axle housing and extending longitudinally to said connection means, said bolt means including dowel means of greater diameter than said shank portion extending vertically through said radius arm leaf spring and having a lower terminal portion interfitting with said axle housing.

13. A vehicle wheel suspension comprising a vehicle frame, an axle housing and wheel means associated therewith, a longitudinally extending leaf spring fixed medially to the upper side of said axle housing and having its opposite ends connected to said frame for limited relative longitudinal movement, radius arm means comprising a spring leaf fixed at one end between the axle housing and the adjacent medial portion of said leaf spring, common clamp means for securing said radius arm spring leaf and said longitudinal leaf spring to said axle housing, and means connecting the other end of said radius arm spring leaf to said vehicle frame, said connection means including a horizontal journal connected to the vehicle frame and bearing means pivotal and axially slidable thereon, coaxial sleeve means about said bearing means and connected to said other end of said spring leaf, and a resilient bushing between said bearing means and said sleeve means.

14. A vehicle wheel suspension comprising a vehicle frame, an axle housing and wheel means associated therewith, a longitudinally extending leaf spring fixed medially to the upper side of said axle housing and having its opposite ends connected to said frame for limited relative longitudinal movement, radius arm means comprising a spring leaf fixed at one end between the axle housing and the adjacent medial portion of said leaf spring, and pivotal members connecting the other end of said radius arm spring leaf and said vehicle frame, one of said pivotal members comprising a horizontal journal and the other comprising a bearing pivotal and axially slidable on said journal, a sleeve surrounding said bearing, and a resilient bushing between said sleeve and bearing, whereby the journal and said sleeve means are mounted for relative conical deflection.

15. A vehicle wheel suspension comprising a vehicle frame, an axle housing and wheel means associated therewith, a longitudinally extending leaf spring fixed medially to the upper side of said axle housing and having its opposite ends connected to said frame for limited relative longitudinal movement, radius arm means comprising a spring leaf fixed at one end between the axle housing and the adjacent medial portion of said leaf spring, common clamp means for securing said radius arm spring leaf and said longitudinal leaf spring to said axle housing, and means connecting the other end of said radius arm spring leaf to said vehicle frame, said connection means including a horizontal journal and bearing means pivotal and axially slidable thereon.

16. A vehicle wheel suspension comprising a vehicle frame, an axle housing and wheel means associated therewith, a longitudinally extending leaf spring fixed medially to the upper side of said axle housing and having its opposite ends connected to said frame for limited relative longitudinal movement, radius arm means comprising a spring leaf fixed at one end between the axle housing and the adjacent medial portion of said leaf spring, means for securing said radius arm spring leaf and said longitudinal leaf spring to said axle housing, and means connecting the other end of said radius arm spring leaf to said vehicle frame, said connection means having vertical pivot bearing means and horizontal transverse pivot bearing means, one of said pivot bearing means engaging with said vehicle frame and the other with said spring leaf.

17. A vehicle wheel suspension comprising a vehicle frame, an axle housing and wheel means associated therewith, a longitudinally extending leaf spring fixed medially to the upper side of said axle housing and having its opposite ends connected to said frame for limited relative longitudinal movement, radius arm means comprising a spring leaf fixed at one end between the axle housing and the adjacent medial portion of said leaf spring, and means connecting the other end of said radius arm spring leaf to said vehicle frame, said connection means including a horizontal pivotal connection with said vehicle frame and a vertical pivotal connection with said spring leaf.

References Cited in the file of this patent

UNITED STATES PATENTS

| Number | Name | Date |
|---|---|---|
| 1,605,223 | Dodge | Nov. 2, 1926 |
| 2,006,644 | Lundelius et al. | July 2, 1935 |
| 2,108,323 | Weiss | Feb. 15, 1938 |
| 2,191,941 | Reid | Feb. 27, 1940 |
| 2,494,683 | Aspin | Jan. 17, 1950 |
| 2,637,569 | Turner | May 5, 1953 |

FOREIGN PATENTS

| Number | Country | Date |
|---|---|---|
| 427,104 | Great Britain | Apr. 12, 1935 |
| 444,872 | Great Britain | Dec. 29, 1934 |
| 596,784 | Germany | May 22, 1934 |